United States Patent [19]

Weiss

[11] 4,219,176

[45] Aug. 26, 1980

[54] TROPHY BASE

[75] Inventor: Allen Weiss, Chicago, Ill.

[73] Assignee: Alamar Associates, Glenview, Ill.

[21] Appl. No.: 927,474

[22] Filed: Jul. 24, 1978

[51] Int. Cl.² ............................................ F16M 13/00
[52] U.S. Cl. .......................... 248/188.1; 248/DIG. 10
[58] Field of Search ...................... 248/158, 188.1, 359, 248/519, DIG. 10

[56] References Cited

U.S. PATENT DOCUMENTS

| 1,270,004 | 6/1918 | Chappell | 248/188.1 X |
|---|---|---|---|
| 2,448,413 | 8/1948 | Borghesi | 248/188.1 |
| 3,119,588 | 1/1964 | Keats | 248/519 X |
| 3,415,475 | 12/1968 | Goodman | 248/188.1 X |
| 3,754,724 | 8/1973 | Osowski | 248/359 |

FOREIGN PATENT DOCUMENTS 994741 8/1976 Canada ...................................... 248/158

Primary Examiner—William H. Schultz
Attorney, Agent, or Firm—Vogel, Dithmar, Stotland, Stratman & Levy

[57] ABSTRACT

The trophy base has top and bottom members and a wall, defining a hollow interior filled with initially fluid material, such as gypsum, which is allowed to set. Bosses on the top and bottom members have bores extending therethrough, which bosses mate to minimize the initially fluid filler material from leaking out. An annular lip on one of the bosses encircles the other boss and serves substantially to eliminate fluid material from leaking out.

10 Claims, 11 Drawing Figures

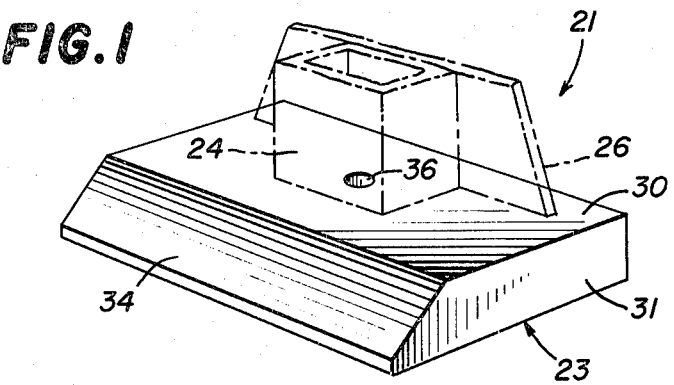
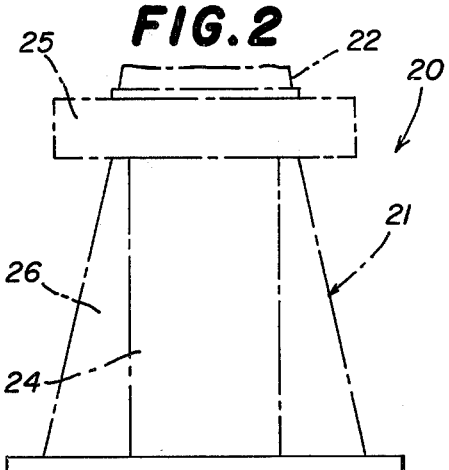
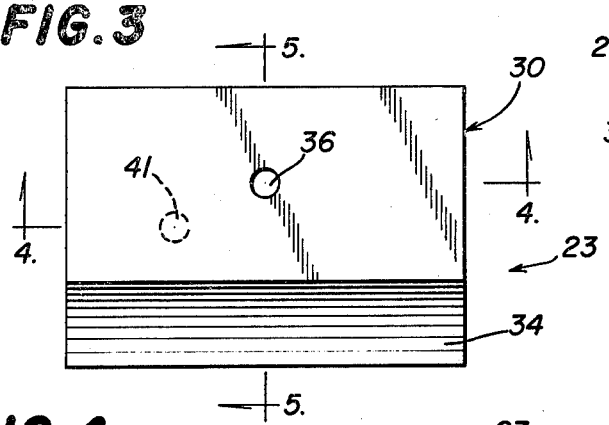
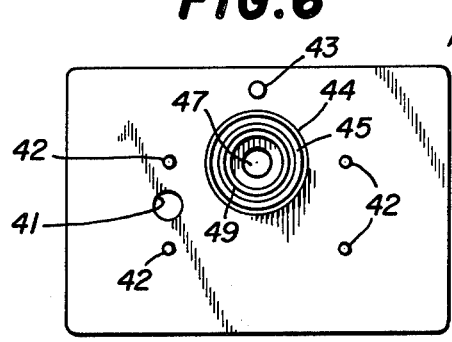
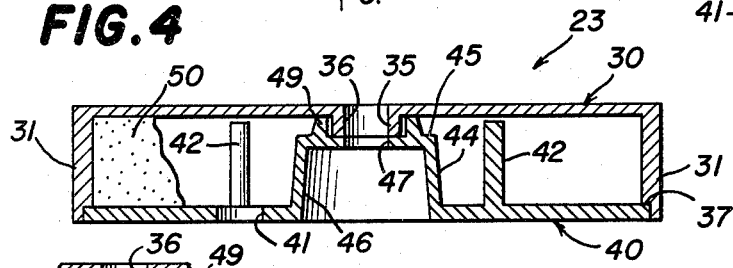
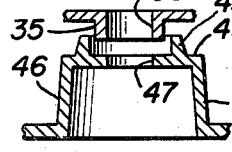
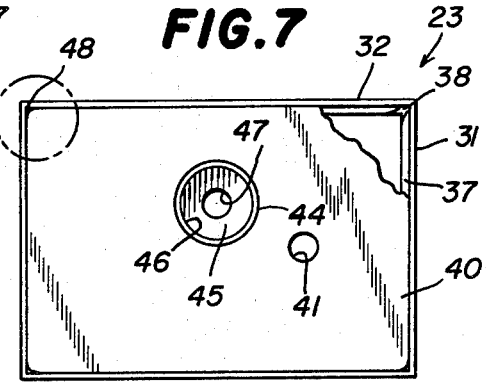
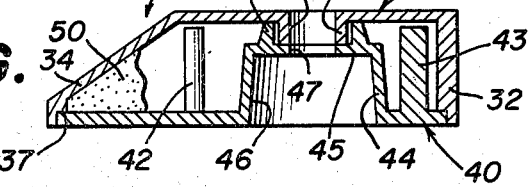
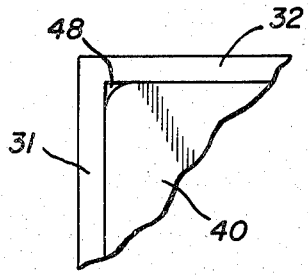
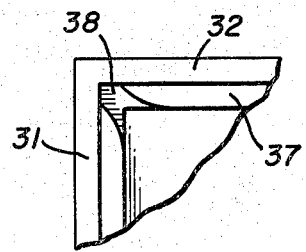
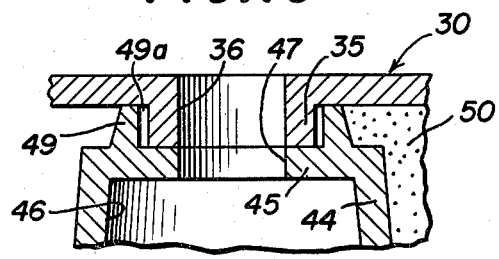

TROPHY BASE

BACKGROUND OF THE INVENTION AND PRIOR ART STATEMENT

A trophy usually includes a pedestal on top of which is mounted a figurine signifying a particular event. The pedestal often includes a base and a capital joined by a column. In the past, the base and the capital have been similarly constructed of a solid, marble-like material. However, this has proved to be too expensive.

During the past few years, there has been on the market a base made and sold by the assignee of the present application. This base was hollow, having top and bottom members and a side wall. The interior was filled with an initially fluid material such as gypsum. The fluid material was allowed to set, resulting in a base which approximated a marble base in size, shape, weight and somewhat in appearance. Posts on the bottom member extended into the filler material to improve the interconnection between the top and bottom members. Bosses on the top and bottom elements had bores extending therethrough, which bosses mated to reduce the possibility of the initially fluid filler material from leaking out. However, it was found that even with these bosses, the filler material had a tendency to leak out.

SUMMARY OF THE INVENTION

It is therefore an important object of the invention to provide a trophy base having a hollow interior which is filled with an initially fluid material, and which has means substantially to eliminate material from leaking out during filling.

In summary, there is provided a base for a trophy comprising a bottom plate member, a top plate member spaced from the bottom plate member, a side wall between the bottom plate member and the top plate member and around the peripheries thereof, the wall and the plate members defining a shell with a substantially hollow interior, the bottom plate member having a hole therein for admitting into the hollow interior fluid filler material which is thereafter allowed to set, first and second bosses respectively on the top plate member and the bottom plate member and extending toward each other, the bosses respectively having aligned first and second bores extending therethrough for receiving a fastening bolt, the inner ends of the bosses being in contact to minimize the amount of fluid filler material entering the bores during the filling of the shell, and an annular lip on one of the bosses having an internal diameter greater than the exterior diameter of the other of the bosses and a height substantially equal to the height of the other boss, the outer surface of the lip contacting the member carrying the other boss substantially to eliminate fluid filler material from entering the bores during the filling of the shell.

The invention consists of certain novel features and a combination of parts hereinafter fully described, illustrated in the accompanying drawings, and particularly pointed out in the appended claims, it being understood that various changes in the details of the article may be made without departing from the spirit, or sacrificing any of the advantages, of the invention.

BRIEF DESCRIPTION OF THE DRAWINGS

For the purposes of facilitating an understanding of the invention, there is illustrated in the accompanying drawings a preferred embodiment thereof, from an inspection of which, when considered in connection with the following description, the invention, its construction, and many of its advantages should be readily understood and appreciated.

FIG. 1 is a perspective view of a trophy base incorporating the features of the present invention, a portion of the column and rear plate being shown in phantom;

FIG. 2 is a front elevational view of the trophy base depicted in FIG. 1, with the column, the capital, and the lower portion of a figurine depicted in phantom;

FIG. 3 is a top plan view of the trophy base;

FIG. 4 is an enlarged sectional view of the trophy base taken along the line 4—4 of FIG. 3, but with most of the filler material not shown;

FIG. 4A is a sectional view like FIG. 4, but only the central portion thereof, and the top and bottom plate members slightly displaced from their final positions;

FIG. 5 is an enlarged sectional view of the trophy base taken along the line 5—5 of FIG. 3, with most of the filler material not being shown;

FIG. 6 is a top plan view of the bottom plate member of the trophy base;

FIG. 7 is a bottom plan view of the trophy base;

FIG. 8 is a view on an enlarged scale of the matter in the circle labeled "8" of FIG. 7;

FIG. 9 is a view like FIG. 8, but with the bottom plate having been removed; and FIG. 10 is an enlarged view in vertical section showing the details of the bosses and the lip and how they mate with one another.

DESCRIPTION OF THE PREFERRED EMBODIMENT

Turning now to the drawings, and more particularly to FIGS. 1 and 2 thereof, there is shown a trophy 20 made up of a pedestal 21 carrying a figurine 22. Only the bottom portion of the figurine 22 is depicted. The pedestal 21 includes a base 23, a column 24 mounted on the base 23 and extending upwardly therefrom, a capital 25 carried by the column 24 and secured thereto, and a rear plate 26 in the shape of a trapezoid. In the particular form shown, the capital 25 is smaller than the base 23. They may be of the same size, except that the front of the base is usually sloped, as shown, whereas the front of the capital 25 is squared off.

The base 23 is preferably formed of plastic and comprises a top plate member 30 having a pair of depending side walls 31, a depending rear wall 32 and a front wall 33. The front wall 33 has a sloped portion 34. In the particular form shown, the walls 31, 32 and 33 are integral with the top plate member 30. Extending downwardly from the top plate member 30 is a boss 35 having a bore 36 extending therethrough. The boss 35 is located midway between the wall 31, but is closer to the rear wall 32 than to the forwardmost part of the front wall 33. The bottom or outer end of each of the walls 31, 32, and 33 has a recessed portion to define a ledge 37 completely encircling the base 23. As is best seen in FIG. 9, a groove 38 is formed in the ledge 37 at each of the four corners thereof. Each such groove 38 extends diagonally, opens outwardly, and also opens toward the interior defined by the top plate member 30 and the walls 31, 32, and 33.

The trophy base 23 further comprises a bottom plate member 40 having a hole 41 for admitting fluid, filler material, as will be explained. A plurality of posts 42 is on the bottom plate member 40 and extends upwardly therefrom. A fifth post 43 of larger diameter also is on the bottom plate member 40 and extends upwardly therefrom. The posts 42 and 43 are integral with the bottom plate member 40. A boss 44 is formed on and integral with the bottom plate member 40, which boss 44 has an inner wall 45 that defines a bore or recess 46, the wall 45 having a hole 47 therein. Each of the corners of the bottom plate member 40 is rounded-off as shown, to define an opening 48, as will be described. The lengths of the bosses 35 and 44 are such that the inner wall 45 will contact the inner end of the boss 35, when the parts are assembled. The boss 44 carries an upstanding lip 49 having an internal diameter greater than the external diameter of the boss 35, so that when the parts are assembled an annular air space 49a is created. The height of the lip 49 is substantially equal to the height of the boss 35 so that when the parts are mated, there is contact (A) between the outer end of the boss 35 and the boss 44, and (B) between the outer surface of the lip 49 and the top plate member 30.

The thickness of the bottom plate member 40 substantially equals the depth of the ledge 37, so that, when the bottom plate member 40 is set in place, its bottom surface will be flush with the bottom end of the walls 31, 32, and 33. The lengths of the posts 42 and 43 are such that they are slightly spaced from the top plate member 30. Further, the hole 47 in the inner wall 45 is aligned with the bore 36 in the boss 35. As is best seen in FIG. 8, the rounded-off corners of the bottom plate member 40 define openings 48 which communicate respectively with the grooves 38. Thus, when the bottom plate member 40 is in position, the openings 48 and the grooves 38 define passages for air into the hollow interior of the base 23.

When the top plate member 30 is assembled onto the bottom plate member 40, they define a shell with a hollow interior. Fluid material 50, such as gypsum, is delivered into the hollow interior through the hole 41. The boss 35 being in contact with the boss 44, reduces the amount of material which leaks out through either the bore 36 or the recess 46. Because the lip 49 contacts the top plate member 30, a further barrier to the fluid material is provided, thereby substantially eliminating filler material from leaking out during filling. The gap 49a, which may be present, defines a trap for any such material. Enough material is admitted to fill the entire hollow interior. The openings 48 and the grooves 38 accommodate air flow to pass by the fluid material and to allow same to set. The posts 42 and 43 extend deep within the filler material 50 and are firmly secured thereto. The base 23 is, therefore, strong and has the appearance and effect of a solid body. Yet is of formed of spaced plate-like members and a surrounding wall, with a filler material therein.

As previously noted, the capital 25 preferably has the same basic construction as the base 23, except it is smaller and does not have the sloped portion 34. Moreover, such capital 25 is inverted relative to the position of the base 23; that is, whereas the recess 46 of the base 23 faces downwardly, the corresponding recess in the capital 25 faces upwardly. It is to be understood that the capital 25 may be considered a base also.

In assembling the pedestal 21, a long bolt is threaded through the capital 25, through the central opening in the column 24, and through the bore 36, so that its end resides in the recess 46. A nut is threaded onto such end and, when tightened, it securely holds together the various elements of the pedestal 21. The nut is concealed in the recess 46, while the head of the bolt is concealed within the corresponding recess in the capital 25.

It is believed that the invention, its construction, and its advantages should be readily understood from the foregoing without further description, and it should also be manifest, that, while a preferred embodiment of the invention has been shown and described for illustrative purposes, the details as to the structure are, nevertheless, capable of wide variation within the purview of the invention, as defined in the appended claims.

What is claimed is:

1. A base for a trophy comprising a bottom plate member, a top plate member spaced from said bottom plate member, a side wall between said bottom plate member and said top plate member and around the peripheries thereof, said wall and said plate members defining a shell with a substantially hollow interior, said bottom plate member having a hole therein for admitting into said hollow interior fluid filler material which is thereafter allowed to set, first and second bosses respectively on said top plate member and said bottom plate member and extending toward each other, said bosses respectively having aligned first and second bores extending therethrough for receiving a fastening bolt, the inner ends of said bosses being in contact to minimize the amount of fluid filler material entering said bores during the filling of said shell, and an annular lip on one of said bosses having an internal diameter greater than the exterior diameter of the other of said bosses and a height substantially equal to the height of said other boss, the outer surface of said lip contacting the member carrying said other boss substantially to eliminate fluid filler material from entering said bores during the filling of said shell.

2. The base of claim 1, wherein said lip is on said second boss.

3. The base of claim 1, wherein the relative diameters of said bosses are such as to create an annular space therebetween defining a trap for the fluid material.

4. The base of claim 1, wherein said lip has an inner wall substantially parallel to said other boss and an outer wall which is tapered inwardly toward said other boss.

5. The base of claim 1, wherein the diameters of said second boss and said second bore are respectively greater than the diameters of said first boss and said first bore, said second boss having an inner wall at the inner end thereof in contact with the inner end of said first boss, said inner wall having therein a hole with a diameter substantially equal to the diameter of said first bore, said second bore defining a recess for a nut that engages a bolt extending through said first bore and said hole and into said second bore.

6. The base of claim 1, wherein said wall is integral with said top plate member and depends therefrom.

7. The base of claim 1, wherein said filler material includes gypsum.

8. The base of claim 1, and further comprising a plurality of posts on said bottom plate member and extending toward said top plate member, said filler material adhering to said posts to improve the retention of said bottom plate member by said filler material.

9. The base of claim 1, wherein said wall has a recessed portion defining a ledge, said bottom plate member resting against said ledge.

10. The base of claim 9, wherein said ledge has a depth to enable the outer surface of said bottom plate member to be substantially flush with the adjacent outer end of said wall.

* * * * *